April 6, 1937.  A. L. KLEIN  2,076,150
FLAP OPERATING MEANS
Filed Nov. 20, 1934    2 Sheets-Sheet 1
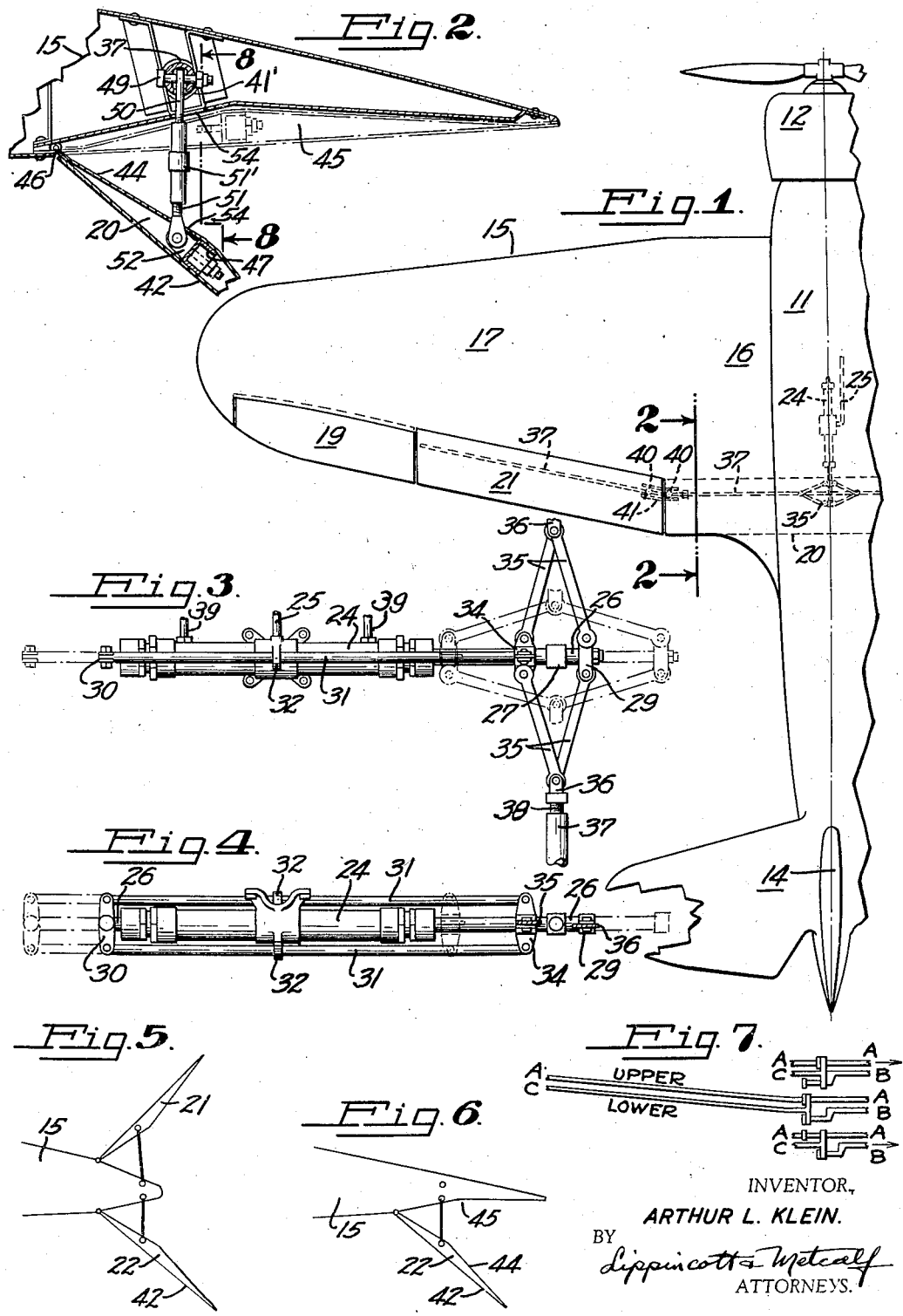
INVENTOR,
ARTHUR L. KLEIN.
BY Lippincott & Metcalf
ATTORNEYS.

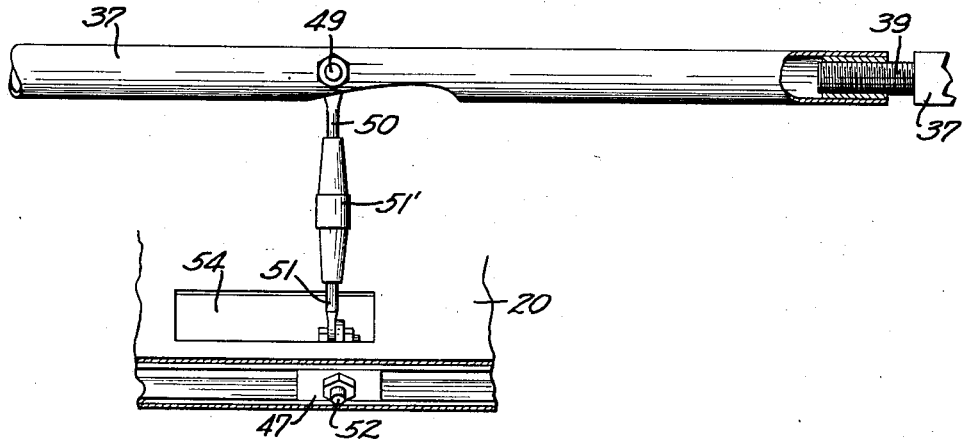
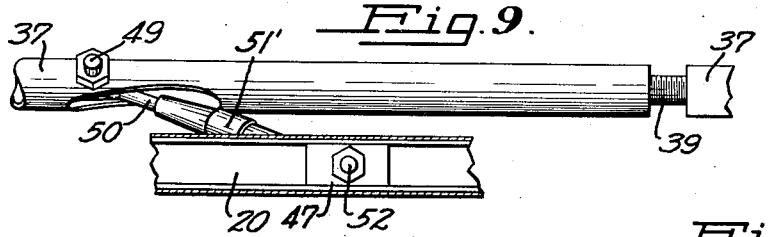
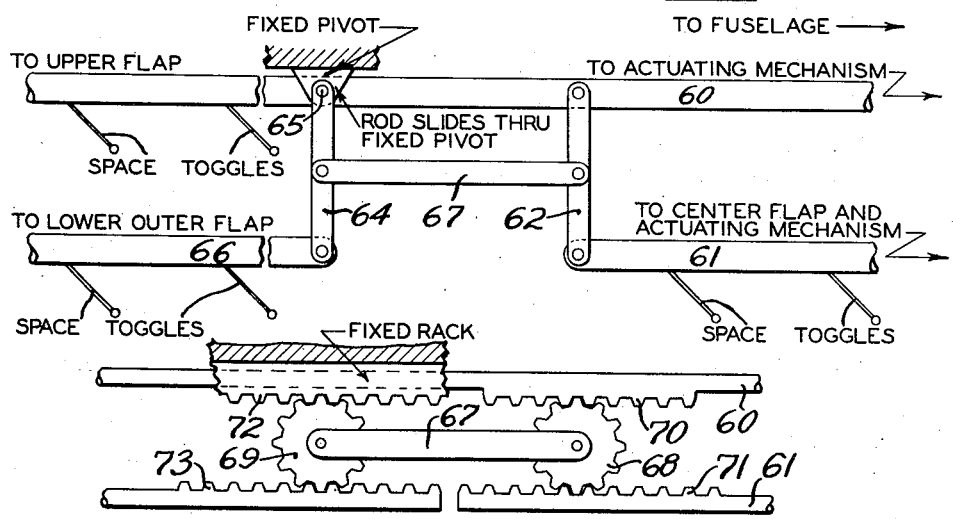

Patented Apr. 6, 1937

2,076,150

UNITED STATES PATENT OFFICE 2,076,150

FLAP OPERATING MEANS

Arthur L. Klein, Los Angeles, Calif., assignor to The Northrop Corporation, Inglewood, Calif., a corporation of California Application November 20, 1934, Serial No. 753,871

4 Claims. (Cl. 244—42)

My invention relates to heavier-than-air craft, and more particularly to means for operating wing flaps or similar devices thereof.

Among the objects of my invention are: to provide a means for opening and closing wing flaps forming a part of an airplane wing; to provide means for operating such wing flaps positioned in different locations on an airplane wing simultaneously; to provide a means for selectively operating a plurality of wing flaps in order to obtain differing results therefrom; to provide a means of selectively operating a plurality of wing flaps in order to obtain varying degrees of effective camber; to provide positive means of opening and closing wing flaps forming a part of the wing surface; to provide means for opening and closing adjacent wing flaps whereby opposing stresses imparted to the wing are neutralized; and to provide a means for simultaneously opening and closing opposing wing flaps.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

I am fully aware of the fact that wing flaps of various types have hitherto been used for reducing the flying speed of airplanes. As an example I cite the co-pending application of Allen, Klein, Millikan and Northrop, Serial No. 676,-892, filed June 21, 1933, in which flaps forming a part of the lower wing surface are opened at high attack angles to create a drag, thus reducing landing speed. The instant invention, however, does not have to do directly with the flaps themselves, but deals more particularly with the means by which such flaps are opened and closed, and further deals with flap operating means which are adapted to operate selectively a plurality of wing flaps, both upper and lower, for the control of airplanes such as are contemporaneously disclosed in Patent No. 2,031,177, to John K. Northrop. While, therefore, it is convenient for me to describe my invention as applied to the flaps and planes described by Northrop, it will be obvious to those skilled in the art that the mechanism herein disclosed and claimed is applicable for the operation of wing flaps in any type of airplane and in any combination as may be deemed advisable in accordance with the design thereof.

In the drawings:

Figure 1 is a partial plan view of a conventionalized airplane, showing the location of the wing flaps and indicating the position of the operating mechanism.

Figure 2 is a sectional view of the trailing edge of a wing, showing the flap operating link. The plane of section is indicated by the line 2—2 of Figure 1.

Figure 3 is a plan view of a hydraulic flap operating mechanism.

Figure 4 is a side view of the operating means shown in Figure 3.

Figure 5 is a diagram, showing upper and lower wing flaps open.

Figure 6 is a diagram, showing the contour of the wing with only the lower wing flap open.

Figure 7 is a three part diagram, showing three positions of the selecting mechanism.

Figure 8 is a rear view in elevation of the flap operating rod and space toggle arm connected with a flap when open.

Figure 9 is a view partly in elevation, showing the relative positions of the flap, space toggle and operating rod when the flap is closed.

Figure 10 is a plan view of an alternate selecting mechanism.

Figure 11 is a plan view of still another selecting mechanism.

Figures 8 and 9 have had most of the surrounding structure omitted and, therefore, may be considered as illustrative diagrams reduced to the lowest terms and shown to more clearly illustrate the movement of the space toggle arm and connections.

In the application of Northrop above referred to, he describes a means and method of reducing air speed in an airplane when landing at high angles of attack, by dropping or opening trailing edge flaps pivoted intermediate the trailing and leading edges of a lifting wing. The flaps when thus operated create a heavy drag but also increase the lift of the wing. Landing speeds are thus greatly reduced without loss of control of the plane. At flying speeds at low angles of attack, the flaps are not used and fold up so that the lower surface of the flap becomes a continuation of the normal lower wing surface. As one of the objects of Northrop's invention is to control speed of military planes in a vertical dive, or at other times when high attack angles are used, he describes the use of opposing flaps, one on the lower surface of the wing and one on the upper, which may be opened simultaneously in order to obtain a speed reduction without offering any substantial pitching moment to the plane. Such balanced flaps control the limiting speed of the plane in vertical dives. The present invention is not concerned with the flaps per se but deals solely with them in combination with the mechanism for opening and closing the flaps. For purposes of illustration, my invention will be described as applied to the same type of plane and substantially the same arrangement of wing flaps as that described by Northrop. The invention, however, may readily be applied to other types of planes and flaps or similar devices.

In Figure 1, the plane fuselage 11 is provided at one end with the usual engine and propeller 12 and at the other with the customary vertical and horizontal tail surfaces 14. A wing assembly 15 passes under and is fastened securely to the fuselage. For convenience this wing may be divided into a central section 16 and end sections 17, one of which is not shown. The design of the planes is such that the end sections 17 are tapered so that the wing tip is somewhat narrower than the center section. Each end section is provided with the usual aileron 19, preferably forming the trailing edge of perhaps the outer third of the end sections.

The center section 16 is provided with a lower surface center flap 20 as indicated by the dotted lines in Figure 1 and the section as shown in Figure 2. This flap extends on both sides of the fuselage.

That part of each end section between the end of the center flap 20 and the ailerons is provided with two wing flaps, an upper surface flap 21 and an outer lower surface 22 as shown in Figure 5. These flaps form part of the normal lifting surfaces of the wing when closed, are pivoted to the wing at approximately the same distance intermediate the leading and trailing edge, and, when closed, their rear edges converge closely adjacent the trailing edge of the wing.

It is preferred to control all the lower surface flaps alone for landing purposes, but to utilize both upper and lower surface flaps when limiting diving speed. One preferred form of control mechanism will be described.

A source of liquid under pressure (not shown) is provided, either driven from the airplane motor, or by a small separate electric motor or by hand. Interlinked flap operating means are controlled by the liquid, and as the means are substantially alike, the complete system for operating one set of flaps will be described in full, the interlinkage of the two systems being later referred to and described.

Liquid is fed from the source, under control of the pilot, into a hydraulic cylinder 24 through a central pipe 25 between two opposed pistons not shown, each connected to piston rods 26 passing through opposite ends of the cylinder. One piston rod passes straight out through a bearing 27 and is capped by a single rod toggle block 29, the other piston rod being inserted into a transmission rod block 30 carrying a pair of transmission rods 31/31, which, after passing through rod bearings 32/32, are inserted in a double rod toggle block 34. Each toggle block carries a pair of oppositely extending toggle arms 35/35 which join a pair of wing fittings 36/36 to which laterally extending wing rods 37/37 are attached, preferably by a long screw thread 38. When the pistons are forced apart by the pressure of the liquid air between, the toggle is extended, thus causing the wing rods to move laterally toward the fuselage. In order to return the pistons to their original position I prefer to supply the liquid under pressure from the source to the opposite sides of the pistons through end inlets 39/39, whereupon the toggle assumes its original shape and the wing rods return to their original position under positive control of the pilot, and it is this motion which I utilize to open and close the wing flaps. The liquid may be controlled by the use of well known types of four-way valves.

As the wing rods, in their passage through the wing are preferably placed near the trailing edge, in order to be available to operate the trailing edge flaps, it is desirable, in order that the rods pass along the wing parallel to the flaps, to change their direction somewhat, due to the tapered end section. This is easily done, however, by providing the rods with two universal joints 40—40, and changing direction at that point. A sleeve 41 may be provided to take up the directional thrust.

As the wing rod passes along the wing, wing bearings 41' are provided at suitable intervals and where wing rods are co-extensive with the flaps, flap operating space toggles are provided as shown in Figure 2.

Here, the flap 20, for example is of triangular section, the lower surface 42 being a continuation of the lower wing surface, the upper surface 44 fitting into a wing well 45 when the flap is closed. The flap is hinged on a pivot 46 and is provided with a space toggle fitting 47 firmly attached to the flap slightly forward of its long axis. The wing rod is pierced, and a space toggle arm hinged thereto by a space toggle bolt 49. This space toggle arm comprises a wing rod section 50, a flap section 51, and a central turn buckle 51' threaded to each of them. The flap section is hinged to a swivel fitting 52 which passes through the space toggle fitting 47 and is free to rotate therein. Suitable apertures 54 are provided for the space toggle arm in the flap and in the wing, and are elongated to accommodate the arm when the flap is closed.

I prefer, when the wing flap is open, to have the space toggle arm approximately perpendicular to the wing rod. In this position the arm is best situated to receive straight compression stress, the stress tending to close the flap being, of course, greatest when the flap is fully open.

Starting from full closed position I will assume that the pistons in cylinder 24 are closely abutting one another at the center of the piston. Liquid forced into the central portion of the cylinder between the pistons causes the pistons to be forced apart, thus moving the wing rods toward the fuselage. This motion pulls the upper part of the space toggle toward the fuselage, the space toggle arm leaving its folded position and extending the flap outwardly on its hinge. At the full length of piston travel the flap will be fully open, the space toggle moving in three dimensions until it reaches an angle of approximately eighty degrees to the wing rod. In order that the arm assume this position it is necessary that the arm turn at one end in the space toggle fitting 47 and that the wing rod itself turn slightly during the opening. This is accomplished by allowing the wing rods to turn on the long screw thread 39 at the central operating mechanism. In order to close the flap, liquid is admitted under pressure to the end inlets 39, and the wing rods forced outwardly from the fuselage, causing the space toggle to assume a smaller angle with the wing rod and approaching more and more a position approaching parallel to the wing rod, thus closing the flap.

If it should be found desirable resilient means may be added at some point in the system to maintain the flaps tightly closed after all fluid has been withdrawn from the operating cylinder.

The above operating mechanism has been described as applied to the control, for example, of the complete set of lower surface flaps comprising wing flaps 22—22 and the center section flap 20. It is, of course, obvious that the upper surface flaps 21—21 can be controlled by a similar separately operated control mechanism. I prefer, however, to interlink the operating devices so that all three lower surface wing flaps may be opened for landing purposes, for example, without opening the upper surface flaps; and so that both upper and lower surface wing flaps may be opened simultaneously without opening the lower surface center section flap. In this way I can control air speed in diving. Simultaneous opening of the flaps prevents pitching moments developing during the application of the dragging moments.

This selective action of the control mechanism is obtained by the use of one form of a selective interlinkage as shown in Figure 7 where three different linkage positions are shown.

The central position shows rods A, B and C in position with all flaps closed. Rods A and B are attached to separate hydraulic operating mechanism. It should be noted that rod A goes directly to the upper wing flaps while rod C which comes from the lower wing flaps terminates in a yoke through which rods A and B pass. Rods A and B are provided with stops on the flap side of the yoke.

The selective operation is obtained, therefore, by the action of the stops on the yoke. If rod A is pulled, both upper and lower flaps are open. If rod B is pulled, only the lower flap will open. If, therefore, the center section flap is connected to rod B, a pull thereon will open both lower surface wing flap and the center section flap. If rod A is pulled, both upper and lower wing flaps will open simultaneously, but as rod B is not pulled, the center section flap will remain closed. As rod C is not positively driven on the closing motion, a spring closure or equivalent stress is applied to return the flap to closed position and keep it there. A convenient valve may be used to selectively operate the two systems.

It may be that hydraulic power is not available. In that case, I have utilized electric motors to actuate the wing rods. Other power sources will suggest themselves to those skilled in the art.

The flap operating means above described has many advantages. Power may be transmitted by a stiff hollow rod which is positive and strong, eliminating many of the defects of cables. A single power source is available to operate flaps on opposite ends of the wings. The system is such that hand operation is practical as the power source is centrally located.

One of the major features which may be pointed out is the use of a solid space toggle arm between wing and flap. By solid, I refer to the lack of joints or elbows in the arm, the arm being stiff and strong in all positions. The arm is easily covered when the flap is closed with a minimum of cutting in the wing structure. The arm being approximately perpendicular to the wing rod when extended is in the best position to withstand the compression stress and during the opening and closing has a true toggle action. Furthermore, the structure is such that two wing rods, one for the upper flap and one for the lower are closely associated so that the compression strains oppose each other with a minimum of intervening structure.

In the selective operating mechanism above described some type of spring closing mechanism is preferably used to close the lower flap. As this might not be entirely satisfactory in certain no-lift dives, where a condition could occur during which a fairly heavy suction might tend to open the lower flap, I have provided an alternate form of selective operating mechanism which is positive in both directions at all times. The broad principle can be worked out either with a combination of levers, as shown in Figure 10, or by the use of a rack-and-pinion arrangement, as shown in Figure 11. The rack-and-pinion arrangement takes up less space than those of lever arrangement, but the principle is the same in either case.

In the lever arrangement, as shown in Figure 10, upper rod 60 extends from a hydraulic operating cylinder (not shown) straight to the upper wing flap on each wing. Lower rod 61 extends from a separate hydraulic actuating cylinder (also not shown) to a moving lever 62, which is pivoted to lower rod 61 and also to upper rod 60. A fixed lever 64 is supported on a fixed pivot 65 on the wing at its upper extremity, rod 60 sliding through this point, the lower end being connected to a lower toggle rod 66, which extends from the fixed lever 64 to the lower outer wing flap toggles. Levers 62 and 64 are interconnected by a connecting rod 67. When it is desired to operate the upper and lower flaps without the center section flap, upper rod 60 is pulled inwardly toward the fuselage. This opens the upper flaps directly, and as lower rod 61 is fixed during this operation, upper rod 60 actuates lower toggle rod 66 through levers 62 and 64 and connecting rod 67. Connecting rod 67 only moves half as far as upper rod 60, but this motion is doubled again due to the fact that connecting rod 67 is connected at the midpoint of fixed lever 64. It will be seen that this operation is positive to either open or close all flaps. When the lower flaps alone are to be operated, lower rod 61 is moved toward the fuselage, and due to the fact that one end of moving lever 62 is fixed to upper rod 60, which is motionless, lower toggle rod 66 operating the outer lower flap is actuated through the same distance as lower rod 61.

Levers 62 and 64 may be replaced with spur gears 68 and 69, as shown in Figure 11, providing portions of rods 60 and 61 adjacent are provided with mating racks 70 and 71. In this case connecting rod 67 is attached to the center of the gears. The upper teeth of gear 69 mate with a fixed rack 72, the lower teeth engaging a moving rack 73 on the end of lower toggle rod 66. It will be seen that both of these latter actuating mechanisms provide positive closures without the necessity of additional means to hold the flaps closed against a suctional stress tending to open them.

I claim:

1. In combination with an airplane having a wing and a fuselage mounted thereon, opposed upper and lower wing flaps on said wing each side of said fuselage, a central lower surface wing flap, operating rods extending from said fuselage and adapted to move laterally to open and close each of said wing flaps, a single control rod adapted to open and close said lower center flap, a pair of operating mechanisms, means for connecting one of said mechanisms to said rods whereby only all of said lower flaps are opened and closed, and means for connecting said other operating mechanism to said rods whereby only said upper and lower wing flaps are opened and closed.

2. In combination with an airplane having a wing and a fuselage mounted thereon, opposed upper and lower wing flaps on said wing each side of said fuselage, a central lower surface wing flap, operating rods extending from said fuselage and adapted to move laterally to open and close each of said wing flaps, a single control rod adapted to open and close said lower center flap, a pair of operating mechanisms, one of said mechanisms being directly connected to the operating rods controlling the upper wing flaps on each side, the other being directly connected to the control rod operating said lower central flap, a lower flap link pivoted at one end to the operating rod for the lower wing flap, and at the other to a fixed point in line with the operating rod for the upper wing flap, a central flap link parallel and equal in length to said lower flap link pivoted to the upper wing flap-operating rod at one end and to the center flap-control rod at the other, and a connecting link pivoted at each end to the center of the lower and central flap links respectively.

3. In combination with an airplane having a wing and a fuselage mounted thereon, opposed upper and lower wing flaps on said wing each side of said fuselage, a central lower surface wing flap, operating rods extending from said fuselage and adapted to move laterally to open and close each of said wing flaps, a single control rod adapted to open and close said lower center flap, a pair of operating mechanisms, one of said mechanisms being directly connected to the operating rods controlling the upper wing flaps on each side, the other being directly connected to the control rod operating said lower central flap, a lower flap gear mateing with a lower flap rod rack on one side and on the other with a fixed rack in line with the upper flap rod, a central flap gear mateing on one side with an upper flap rod rack and on the other with a central flap rack, and a drive link connecting the axes of said two gears.

4. In combination with an airfoil having a movable section hinged adjacent one edge thereof, actuating mechanism for moving said hinged section comprising a rod mounted for both rotational and longitudinal movement substantially parallel to the axis of the hinge, a rigid link hinged at one end to said rod and at the other to said movable section, the mounting of said rod being at approximately the same distance from said hinge as the connection of said link to said movable section, means for moving said rod longitudinally, and a rotatable joint between said rod and said moving means whereby longitudinal movement of said rod is transmitted as an arcuate movement to the end of the link hinged to the movable section.

ARTHUR L. KLEIN.